United States Patent [19]
Kusumoto et al.

[11] Patent Number: 5,250,864
[45] Date of Patent: Oct. 5, 1993

[54] AC GENERATOR FOR VEHICLES

[75] Inventors: Katsuhiko Kusumoto; Toshinori Tanaka, both of Hyogo, Japan

[73] Assignee: Mitsubishi Denki K.K., Tokyo, Japan

[21] Appl. No.: 912,471

[22] Filed: Jul. 13, 1992

[30] Foreign Application Priority Data

Jul. 19, 1991 [JP] Japan ............... 3-064598[U]

[51] Int. Cl.⁵ .................. H02K 5/00; H02K 9/00
[52] U.S. Cl. ........................... 310/58; 310/89
[58] Field of Search ............ 310/52, 58, 59, 62, 310/63, 53, 60 A, 85, 89, 91

[56] References Cited

U.S. PATENT DOCUMENTS

| | | | |
|---|---|---|---|
| 2,074,067 | 3/1937 | Darnell | 310/62 |
| 2,286,750 | 6/1942 | McMahan | 310/52 |
| 2,436,930 | 3/1948 | Mackmann | 310/52 |
| 2,608,677 | 8/1952 | Wightman et al. | 318/221 |
| 2,716,195 | 8/1955 | Anderson | 310/59 |
| 3,020,427 | 2/1962 | Wheeler et al. | 310/59 |
| 3,761,748 | 9/1973 | Baumann et al. | 310/58 |
| 4,492,885 | 1/1985 | Kitamura et al. | 310/62 |
| 4,859,889 | 8/1989 | Andrews et al. | 310/89 |
| 5,028,826 | 4/1991 | Kitamura et al. | 310/51 |

Primary Examiner—Steven L. Stephan
Assistant Examiner—D. R. Haszko
Attorney, Agent, or Firm—Sughrue, Mion, Zinn, Macpeak & Seas

[57] ABSTRACT

An AC generator for use in a vehicle which can cool sufficiently a coil portion of a stator coil by means of cooling airs blowing through from a plurality of air suction holes to a plurality of air exhaust holes, the airs being produced by fans provided in a rotor. A stator coil is constructed such that a distance from a front end of the coil to a rear end of the coil is overlapped sufficiently on the distance between the blades of fans in the axial direction thereof.

2 Claims, 2 Drawing Sheets

AC GENERATOR FOR VEHICLES

BACKGROUND OF THE INVENTION

The present invention relates to an AC generator for use in a vehicle which achieves ventilation and cooling by use of fans provided in a bracket support type rotor and, in particular, to the improved cooling of a stator coil.

Referring to FIG. 3, there is shown a section view of a conventional AC generator for use in a vehicle. In FIG. 3, a stator 1 comprises a stator iron core 2 and a stator coil 3. A rotor 4 is constructed in the following manner. That is, heteropolar magnetic pole iron cores 5 and 6 are included, in which the respective magnetic pole tooth portions are projected out alternately in the circumferential direction of the rotor 4. An exciting coil 7 is held by and between the magnetic pole iron cores 5 and 6. A rotary shaft 8 is fixedly secured the two magnetic pole iron cores 5 and 6. A pair of slip rings 9 are fixed to the rotary shaft 8 through insulation sleeves, respectively. Fans 10 and 11 are fixed to the magnetic pole iron cores 5 and 6, respectively, and include blades 10a and 11a, respectively.

Next, front and rear brackets 12 and 13 connect the parts of the stator iron core 2 by means of a fastening bolt 14. In the front bracket 12, there is formed a plurality of air suction holes 12a and a plurality of air exhaust holes 12b for ventilation. Also, in the rear bracket 13, similarly, there are formed a plurality of air suction holes 13a and a plurality of air exhaust holes 13b for ventilation. The rotary shaft 8 is supported by the front and rear brackets 12 and 13 through bearings 15 and 16. A pulley 17 is fixed to the rotary shaft 8. When the rotational movements of an engine of a vehicle are transmitted through a belt to the pulley 17, then the pulley 17 allows the rotary shaft 8 to rotate.

Further, a rectifier 18 rectifies an alternating current into a direct current, in which the current is produced by an alternating voltage induced in the stator coil 3. A voltage regulator 19 detects a generator voltage, controls an exciting current, and regulates a terminal voltage to a given value. A brush holder 20 holds and presses a brush 21 against the slip rings 9.

In the above-mentioned conventional AC generator, when the rotor 4 is rotated, an alternating voltage is induced in the stator coil 3, so that electric power is supplied and heat is generated. The ventilative air due to the rotational movements of the fans 10, 11 cools areas of the stator 1 and the rotor 4.

Cooling air caused by the rotation of the fan 10, as shown by an arrow A in FIG. 3, is sucked in through the air suction holes 12a of the front bracket 12, and is then discharged out through the air exhaust holes 12b of the front bracket 12 so as to cool the area of the stator 1. On the other hand, cooling air caused by the rotation of the fan 11, as shown by an arrow B in FIG. 3, is sucked in through the air suction holes 13a of the rear bracket 13, and is then discharged out through the air exhaust holes 13b of the rear bracket 13 so as to cool the rectifier 18, the voltage regulator 19, the area of electricity collector part, and the area of the stator 1.

In the above-mentioned conventional vehicle AC generator of the above type, the end portion of the stator coil 3 is overlapped only slightly in the axial direction of the stator coil 3 on the blades, 10a and 11a of the fans 10 and 11 and therefore the cooling air generated by the fans 10 and 11 flow past only a portion of the coil end portion, with the result that the stator coil 3 cannot be cooled effectively.

SUMMARY OF THE INVENTION

The present invention aims at eliminating the above problem of the above-mentioned conventional AC generator for use in a vehicle.

Accordingly, an object of the invention is to provide an AC generator for use in a vehicle which allows cooling air caused by fans to blow the end portion of a stator coil sufficiently to thereby cool the stator coil more effectively.

In attaining the above object, according to a first embodiment of an AC generator for use in a vehicle in accordance with the invention, there is provided an AC generator in which a distance from a front end of the coil to a rear end of the coil is sufficiently overlapped on between blades of fans in the axial direction of the stator.

On the other hand, according to a second embodiment of the invention, there is provided an AC generator in which the distance from the front end of the coil to the rear end the coil is larger than the distance between the ends of the blades of fans and at least one of front and rear brackets is formed in such a manner that the inner end face thereof opposed to the coil end portion is shifted outwardly in the axial direction, with respect to the inner end face thereof which is opposed to the fans.

According to the present invention, cooling air produced by the fans is allowed to flow past the coil end portion of the stator coil from the inner peripheral side of the stator so as to improve the effect of cooling of the stator coil. Furthermore, according to the second embodiment of the invention, the cooling air, produced by the fans is allowed to flow by the stator coil end portion in a wide range from the inner peripheral side of the stator and, after blowing by the stator coil, the cooling air is allowed to flow through a clearance between the end face of the stator coil end portion and the axially, outwardly shifted inner end face of the bracket, and is then discharged out through air exhaust holes which are formed in the bracket, so that the cooling effect can be improved further.

DETAILED DESCRIPTION OF THE EMBODIMENTS OF THE INVENTION

Figure 1:
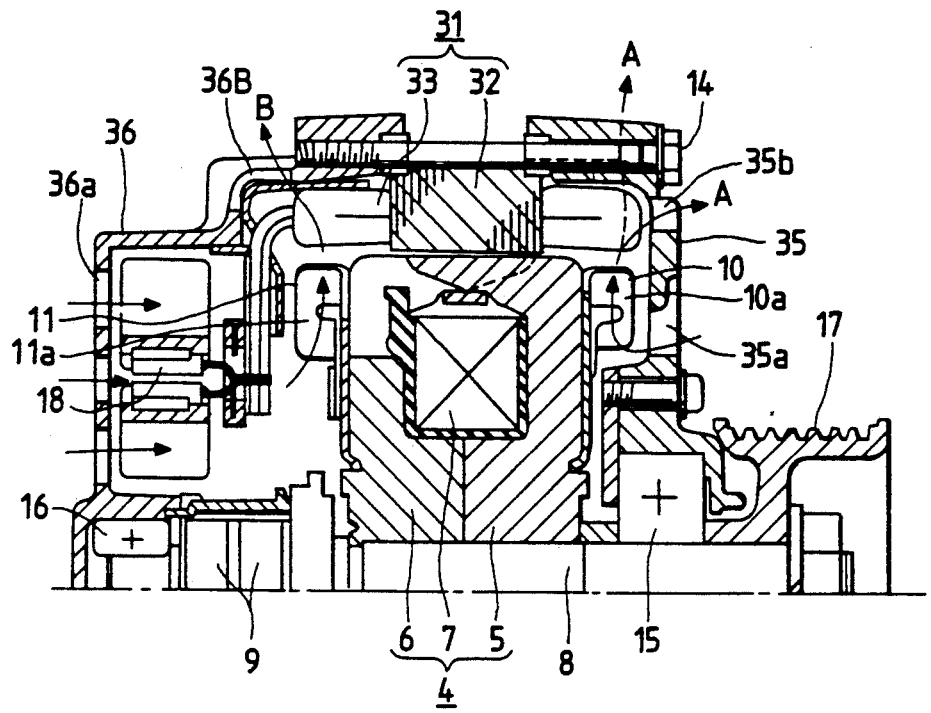
FIG. 1 is a sectional view of an upper half section of a first embodiment of an AC generator for use in a vehicle according to the invention.
Figure 3:
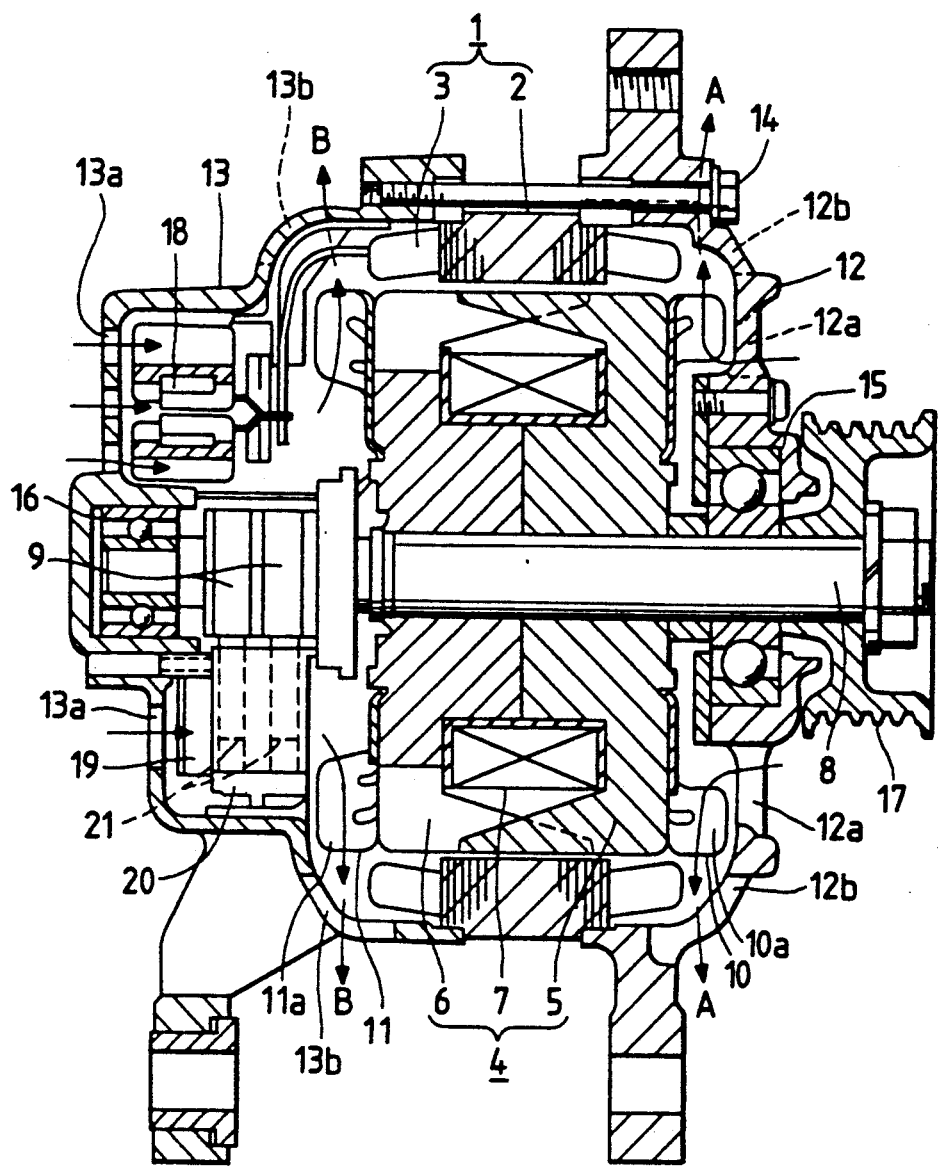
FIG. 3 is a sectional view of an AC generator for use in a vehicle according to the prior art.

Referring now to FIG. 1, there is shown a sectional view of a first embodiment of an AC generator for use in a vehicle according to the invention, in which the elements designated by reference numerals 4–11, and 14–18 have same function with those shown in FIG. 3. And, although not shown in FIG. 1, there are also used a voltage regulator and a brush holder which are similar to those shown in FIG. 3, respectively. A stator 31 includes a stator iron core 32 and a stator coil 33. The stator coil 33 is formed in such a manner that the distance from a front end of the coil to a rear end of the coil is sufficiently long to overlap a distance between the blades 10a and 11b of fans 10, 11 in the axial direction of the stator 33. A front bracket 35 supports the front end portion of the rotary shaft 8 through a bearing 15 and includes a large number of air suction holes 35a and a large number of air exhaust holes 35b. A rear bracket 36 supports the rear end portion of the rotary shaft 8 through a bearing 16 and includes a large number of air suction holes 36a and a large number of air exhaust holes 36b. The stator iron core 32 is connected to the front bracket 35 and rear bracket 36, by means of a fastening bolt 14.

When a rotor 4 is rotated, cooling air generated by fans 10, 11 flows past a substantial portion of the end portion of the stator coil axially from the inner peripheral side of the stator, thereby cooling the stator coil end portion.

As mentioned above, the stator coil 33 is constructed in such a manner that the distance from the front end of the coil to the rear end of the coil sufficiently overlaps axially and outwardly the blades 10a, 11a of the fans 10, 11, which permits the cooling air to flow past a sufficient length of the end portion from the inner peripheral side of the stator. After blowing and cooling the stator, the cooling air is allowed to pass through a clearance between the end face of the coil end portion and the opposing respective inner end faces of the front bracket 35 and rear bracket 36, and is then discharged out through the air exhaust holes 35b and 36b.

Figure 2:
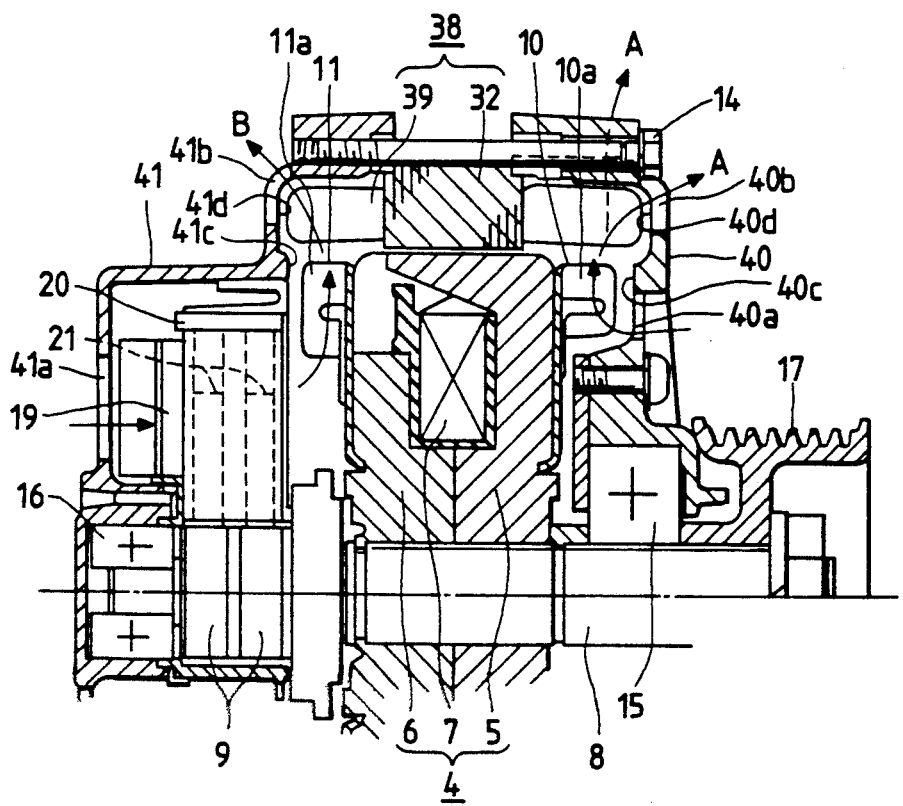
FIG. 2 is a sectional view of an upper half section of a second embodiment of an AC generator for use in a vehicle according to the invention.

Referring now to FIG. 2, there is shown a section view of main portions of a second embodiment of an AC generator for use in a vehicle according to the invention. In this figure, there is also used a rectifier which is similar to that shown in FIG. 3 and is not shown here. A stator 38 consists mainly of a stator iron core 32 and a stator coil 39. The stator coil 39 is constructed in such a manner that the distance from the front end of the coil to the rear end of the coil is sufficiently long to be projected out axially beyond the blades 11a, 11b of fans 10, 11. A front bracket 40 is constructed in such a manner that the inner end face thereof axially opposing the coil end face of the stator coil 39 is shifted outwardly (i.e., is recessed) with respect to the inner end face thereof axially opposing to the blade 10a of the fan 10, to thereby provide such a clearance that allows sufficient cooling air to flow therethrough. Hereupon, a plurality of air suction holes 40a and a plurality of air exhaust holes 40b are formed in the front bracket 40. Further, a rear bracket 41 is constructed in such a manner that the inner end face thereof axially opposing the coil end portion of the stator coil 39 is shifted outwardly (i.e., is recessed) with respect to the inner end face thereof axially opposing the blade 11a of the fan 11, to thereby provide such a clearance that allows sufficient cooling airs to flow therethrough. Hereupon, a plurality of air suction holes 41a and a large number of air exhaust holes 41b are formed in the rear bracket 41.

In the second embodiment, both of the front bracket 40 and rear bracket 41 are constructed such that the respective inner end faces thereof opposing to the stator coil end portion are shifted axially and outwardly with respect to the inner end faces thereof opposing to the fans to thereby provide the clearances, respectively. Alternatively, when one of the front and rear brackets may be constructed in such a manner that a clearance can be provided without axially shifting the inner end face thereof opposing to the stator coil end portion, only the other bracket may be constructed in such a manner that the inner end face thereof is axially shifted.

As was described above, according to the present invention, due to the fact that the distance from the front end of the stator coil to the rear end of the stator coil is sufficiently overlapped on the distance between the blades of the fans in the axial direction thereof, the cooling air produced by the fans is allowed to blow the stator coil end portion from the inner peripheral side of the stator in a sufficient range of length thereof, thereby improving greatly the effect of cooling of the stator coil.

Also, according to the invention, by enlarging the distance from the front end of the stator coil to the rear end of the stator coil axially with respect to the distance between the blades of the fans, and also by axially shifting and outwardly the inner end face of the bracket opposing to the coil end portion with respect to the inner end face thereof opposing to the fans, the coil end portion of the stator coil can be subjected to air flow over a greater length by the cooling air produced by the fans and the cooling air is allowed to flow sufficiently through the clearance between the inner end face of the bracket and the stator coil end portion, thereby further improving the cooling effect of the stator coil.

What is claimed is:

1. An AC generator having a cooling means for use in a vehicle, comprising:
    a stator including a stator iron core and a stator coil mounted to the stator iron core and extending in an axial direction;
    a rotor including two magnetic pole iron cores and an exciting coil secured to said magnetic pole iron cores, the magnetic pole iron cores being fixed to a rotary shaft;
    two fans having blades which are respectively mounted to opposite axial end portions of the magnetic pole iron cores as said cooling means, said blades having a predetermined length in said axial direction; and
    front and rear brackets fixedly connected to said stator and supporting the rotary shaft through bearings, each of said brackets including a plurality of air suction holes and a plurality of air exhaust holes for cooling air flow;
    wherein said stator coil is formed such that a portion thereof extending from a front end of said coil to a rear end thereof in said axial direction overlaps at least a portion of said blades in said axial direction, wherein at least one of said front and rear brackets is formed such that the inner end face thereof opposing the coil end portion of said stator coil includes a recessed portion which is shifted axially and radially outwardly with respect to the inner end face thereof opposing said fans and wherein said exhaust hole in said one bracket is in said recessed portion.

2. An AC generator having a cooling means for use in a vehicle as set forth in claim 1, wherein said stator coil is formed such that the length of said portion of said coil is greater than said predetermined length of said blades.

* * * * *